US010118361B2

(12) United States Patent
Kozan et al.

(10) Patent No.: US 10,118,361 B2
(45) Date of Patent: Nov. 6, 2018

(54) THERMAL INSULATION (71) Applicant: United Technologies Corporation, Hartford, CT (US)

(72) Inventors: Stuart C. Kozan, Bethany, CT (US); William Bogue, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 67 days.

(21) Appl. No.: 15/004,261

(22) Filed: Jan. 22, 2016

(65) Prior Publication Data

US 2017/0210082 A1     Jul. 27, 2017

(51) Int. Cl.
| B32B 3/10 | (2006.01) |
| B32B 3/08 | (2006.01) |
| F16L 59/02 | (2006.01) |
| F16L 59/14 | (2006.01) |
| F16L 59/16 | (2006.01) |
| F17C 13/00 | (2006.01) |

(52) U.S. Cl.
CPC .............. *B32B 3/08* (2013.01); *F16L 59/028* (2013.01); *F16L 59/029* (2013.01); *F16L 59/14* (2013.01); *F16L 59/163* (2013.01); *F16L 59/166* (2013.01); *F16L 59/168* (2013.01); *F17C 13/001* (2013.01); *B32B 2307/304* (2013.01); *B32B 2571/00* (2013.01)

(58) Field of Classification Search
None
See application file for complete search history.

(56) References Cited

U.S. PATENT DOCUMENTS

| 5,575,402 A | 11/1996 | Botsolas | |
| 5,979,371 A * | 11/1999 | Lewis | F24H 1/182 122/19.2 |
| 2003/0210902 A1* | 11/2003 | Giamati | H01C 1/08 392/444 |
| 2007/0289451 A1* | 12/2007 | Rice | F24H 1/182 99/275 |

FOREIGN PATENT DOCUMENTS

| DE | 7237684 | 10/1972 | |
| DE | 4204451 A1 * | 8/1993 | ............. B65D 25/36 |
| EP | 2662608 | 11/2013 | |
| GB | 1029897 | 5/1966 | |

OTHER PUBLICATIONS

Machine translation of DE4204451 Retrieved on May 14, 2018.*
European Patent Office, European Search Report dated Jun. 21, 2017 in Application No. 17152285.7-1754.

* cited by examiner

*Primary Examiner* — Christopher M Polley
(74) *Attorney, Agent, or Firm* — Snell & Wilmer L.L.P.

(57) ABSTRACT

A thermal protection apparatus is disclosed. The thermal protection apparatus may comprise a thermally insulative layer positioned proximate to a portion of a structure having a dimensional transition, wherein the dimensional transition is thermally protected.

13 Claims, 12 Drawing Sheets

THERMAL INSULATION

FIELD

The present disclosure relates generally to mechanisms to thermally insulate structures, and more specifically, to thermally insulate structures having dimensional transitions.

BACKGROUND

Frequently, a fabric or other material is wrapped around a curved structure to thermally insulate the structure. However, structures presenting compound curvatures and other dimensional transitions present challenges. For instance, the fabric or other material may be prone to folding and pinching, and arranging the fabric or other material to insulate the radial/dimensional transition of the curved structure may cause the fabric or other material to wrinkle or lie bulkily proximate to the curved structure. Moreover, shaped or contoured thermal insulators are more complex and expensive to fabricate than flat panel materials, such as fabrics.

SUMMARY

A thermal protection apparatus including a transition structure comprising a layer configured to thermally insulate a dimensional transition of the structure, and a closure configured to secure the transition structure in fixed position.

In various embodiments, the transition structure includes a spiral interleave transition structure including a plurality of flaps arranged to spirally overlap and configured to conform to the dimensional transition. The closure may include a spiral matrix intersection including a region wherein a distal tip of flap overlaps at least another flap. The transition structure may include a petal overlap transition structure including a plurality of petal interleaves arranged to at least partially overlap. The plurality of petal interleaves may leave exposed a dimensional reduction portion. Each petal interleave may comprise a curved distal tip. Each petal interleave may include a curved shape. In various embodiments, the curved shape includes one of a cross section of a conic, a tangent ogive, a spherically blunted tangent ogive, a secant ogive, an elliptical shape, an oval shape, a parabolic shape, an ovoid shape, an ellipsoid shape, and a shape defined by a power series.

In various embodiments, the closure may include a fastener. The fastener may be disposed through a portion of one of the plurality of petal interleaves. The fastener may be disposed through the portion of the petal interleave including an outermost petal interleave.

A thermally protected structure is disclosed. In various embodiments, the thermally protected structure may include a thermal protection apparatus, and a structure including a dimensional transition, wherein the thermal protection apparatus overlays the dimensional transition and thermally insulates the dimensional transition.

In various embodiments, the thermal protection apparatus may comprise a transition structure including a layer configured to thermally insulate the dimensional transition of the structure, and a closure configured to secure the transition structure in fixed position.

A method of installing a thermal protection apparatus is disclosed. In various embodiments, the method may include positioning a protective layer including a non-discontinuous layer configured to thermally insulate a dimensionally continuous portion of a structure proximate to the structure, overlaying a transition structure including a layer configured to thermally insulate a dimensional transition of the structure atop the dimensional transition, and affixing a closure configured to secure the transition structure in fixed position.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials. Moreover, as used herein, "thermally protect," "thermally insulate," and/or the like may mean impeding thermal energy exchange, for example, by shielding from radiant heat, deflecting heated air, shielding from convection heat, shielding from conducted heat, and/or the like.

Figure 1A:
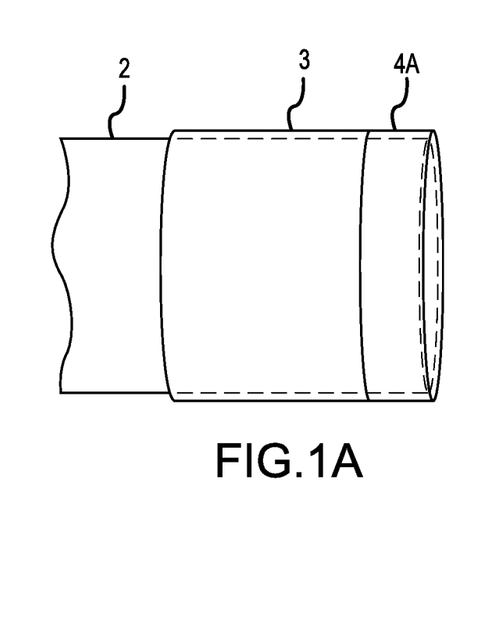
FIG. 1A illustrates a thermally protected structure comprising an end closure, in accordance with various embodiments.
Figure 1B:
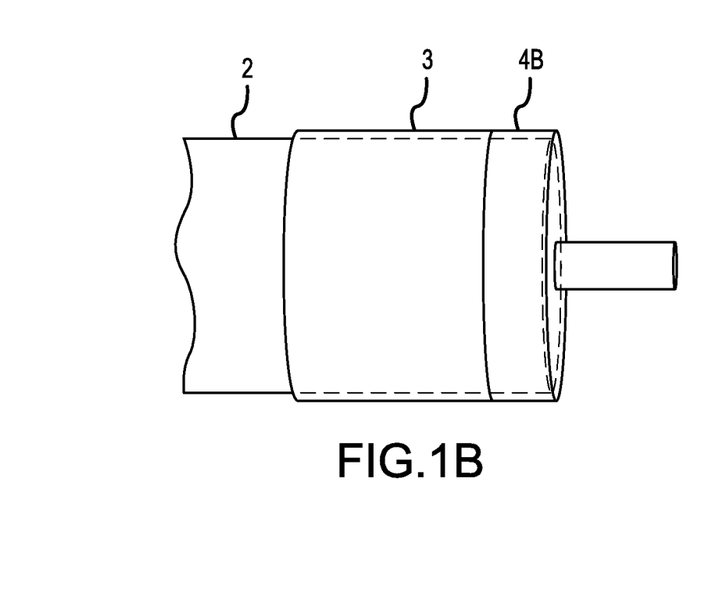
FIG. 1B illustrates a thermally protected structure comprising a dimensional reduction, in accordance with various embodiments.
Figure 1C:
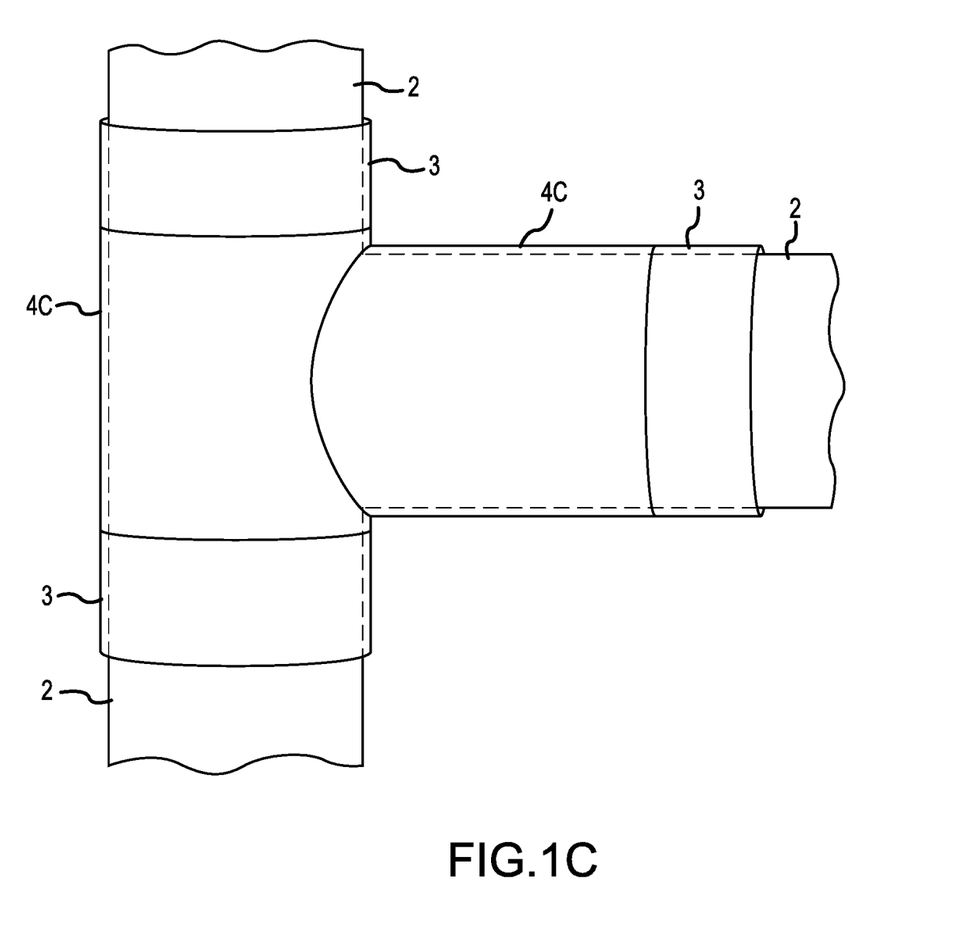
FIG. 1C illustrates a thermally protected structure comprising a manifold joint, in accordance with various embodiments.

With reference now to FIGS. 1A, 1B, and 1C, in accordance with various embodiments, thermally protected structures are depicted. A thermally protected structure may comprise a structure 2 that is at least partially thermally insulated by a thermal protection apparatus 4 ("thermal protection apparatus 4" may refer to thermal protection apparatus 4A, 4B, and/or 4C). A thermal protection apparatus 4 may comprise a thermally insulative layer positioned proximate to a portion of structure 2. The thermal protection apparatus 4 may be disposed over at least a portion of structure 2. Structure 2 may comprise any shaped item and/or dimensional transition (e.g., widening, narrowing, curving in at least two dimensions, conic, etc.). In various embodiments, structure 2 may comprise a shaft that ends on one end, which may be referred to as an end closure, as depicted in FIG. 1A. In various embodiments, the structure 2 may comprise a shaft of a first diameter that interfaces with a shaft of a second diameter, which may be referred to as a dimensional reduction, as depicted in FIG. 1B. In various embodiments, the structure 2 may comprise a shaft existing along a first axis that interfaces with a shaft existing along a second axis, which may be referred to as a manifold joint, as depicted in FIG. 1C. In various embodiments, the structure 2 may comprise a shaft with a spheroid, semispheroid, or other curvature or compound curvature disposed at one end. Moreover, the structure 2 may comprise any other shaped item and/or dimensional transition, for example curvatures, conic sections, discontinuities, compound curvatures, and/or the like, desired to be thermally insulated.

In various embodiments, a thermal protection apparatus 4 may present a closure of material strips which may be sewn, co-molded, bonded, and/or the like to provide a barrier to thermal penetration while providing a tight fit over the structure 2, which may be particularly important in instances where the dimensional transition reduces the size or orientation of features of the structure 2. Moreover, the thermal protection apparatus 4 may float over the structure 2, permitting the structure 2 to lengthen, to shorten, and to shuttle, such as in response to thermal expansion. The thermal protection apparatus 4 may be sewn, bonded, cinched, or otherwise joined to a wrap member 3. A wrap member 3 may extend over a different portion of the structure 2, such as a portion of structure 2 that does not comprise a dimensional transition, and thus provide thermal insulation to a separate portion of the structure 2 from thermal protection apparatus 4.

With reference now to FIGS. 1A-1C and 2, in various embodiments, a thermal protection apparatus 4 and wrap member 3 may comprise various components. For instance, a wrap member 3 may comprise a protective layer 6. A thermal protection apparatus 4 may comprise a transition structure 7 and/or a closure 10. The protective layer 6 and transition structure 7 may comprise thermally insulative sheet material of similar or differing type that are coupled such as by bonding, sewing, gluing, and/or the like. The material of each may comprise a single ply, or in further embodiments, may comprise multiple plies.

Figure 2:
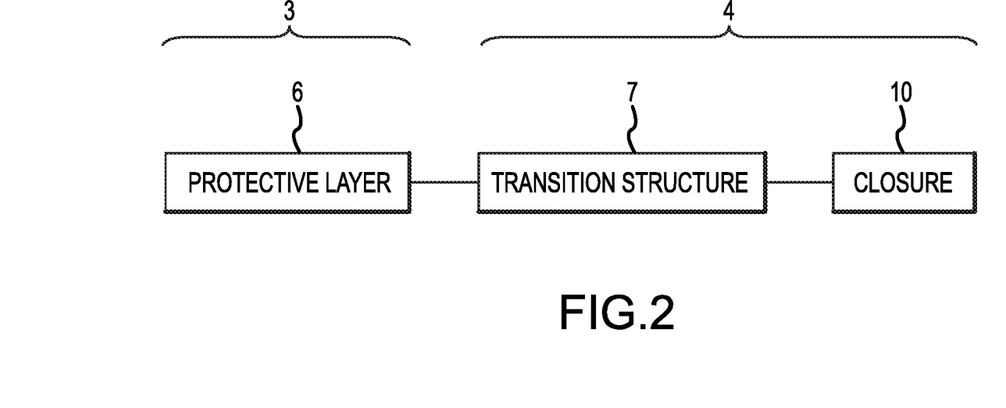
FIG. 2 illustrates various aspects of a thermal protection apparatus, in accordance with various embodiments.

A protective layer 6 of a wrap member 3 may comprise a non-discontinuous portion of the wrap member 3 shaped to thermally insulate a portion of a structure 2 not exhibiting dimensional transitions (i.e., "dimensionally continuous").

The thermal protection apparatus 4 may be desired to be implemented so as to also provide thermal protection to a portion of a structure 2 that does exhibit dimensional transitions. As such, a transition structure 7 may be provided. A transition structure 7 may comprise a portion of the thermal protection apparatus 4 configured to accommodate dimensional transitions. For instance, a transition structure 7 may have slits, flaps, layers, segments, and/or the like, whereby the transition structure 7 may provide thermal insulation to a dimensional transition, for instance, by overlapping itself across a first dimension in order to facilitate curvature along a second dimension (such as in the instance of a structure 2 having a compound curvature).

The thermal protection apparatus 4 may be desired to be securable in position relative to the structure 2. For instance, the transition structure 7 may comprise features tending to move about, jostle, and/or dislocate, such as under the influence of airflow, mechanical movements, etc. As such, as closure 10 may be disposed proximate to the transition structure 7, whereby a first portion of the transition structure 7 may be connected to a second portion of the transition structure 7 to prevent unwanted relative movement of the first and second portions of the transition structure 7.

Figure 3A:
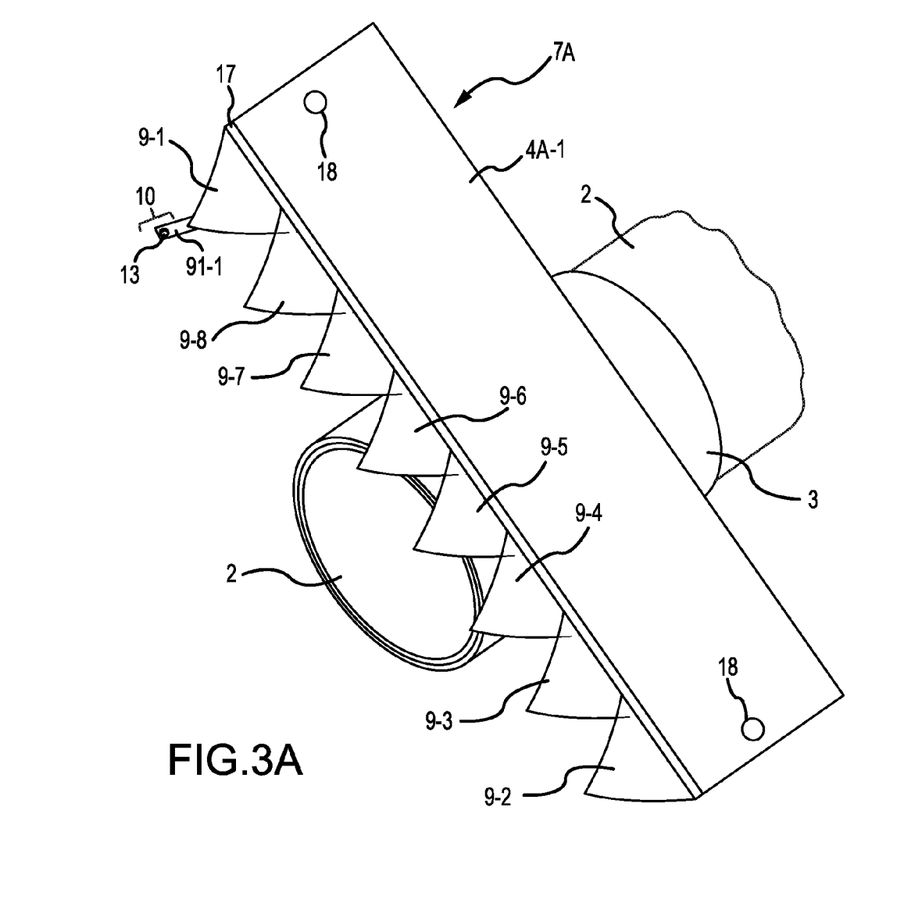
FIGS. 3A, 3B, and 3C illustrate various aspects of a spiral interleave transition structure at a closure, in accordance with various embodiments.

With reference to FIGS. 2 and 3A-3C, in various embodiments, a transition structure 7A may comprise a spiral interleave transition structure 8. FIG. 3A depicts thermal protection apparatus 4A-1 before being coupled to wrap member 3 and/or structure 2. In various embodiments, thermal protection apparatus 4A-1 may wrap circumferentially around wrap member 3 and/or structure 2 at the dimensional transition of structure 2. Transition structure 7A may be coupled to itself around wrap member 3 and/or structure 2 via a fastener 18 Thermal protection apparatus 4 may be cinched by cinch strap 17 to wrap member 3 and/or structure 2. A spiral interleave transition structure 8 may comprise a plurality of flaps arranged to spirally overlap when overlaid on a portion of a structure exhibiting a dimensional transition and configured to conform to the dimensional transition.

Figure 3B:
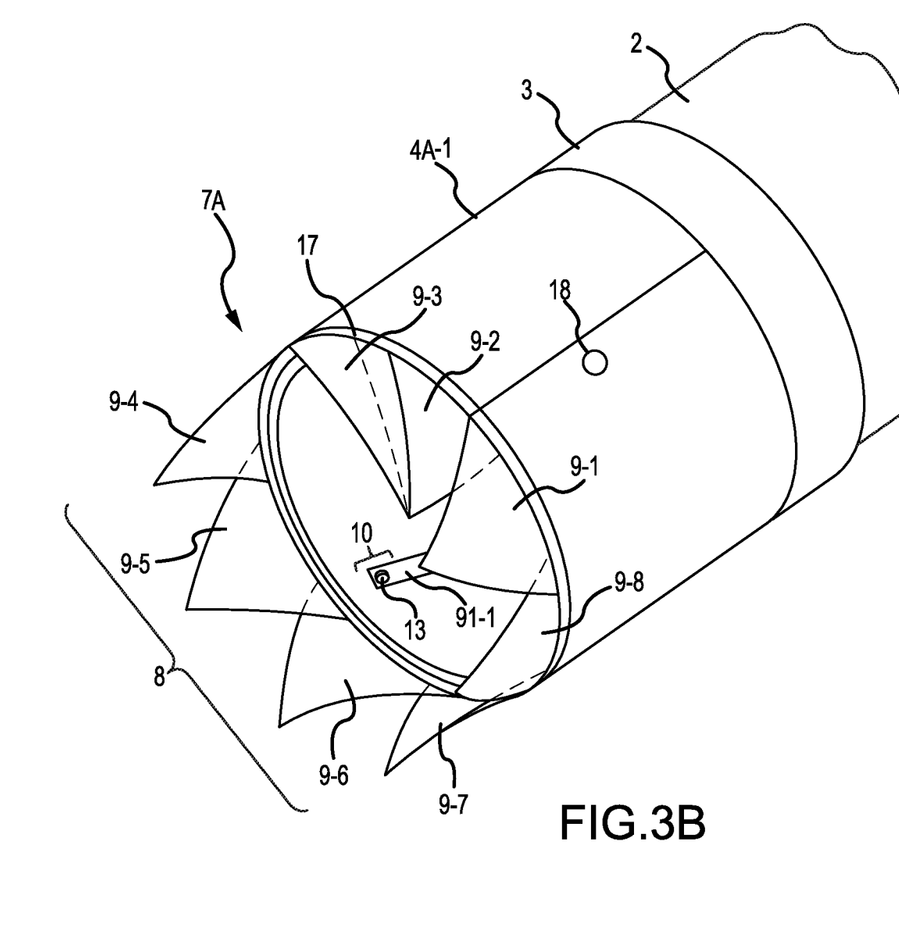
Figure 3C:
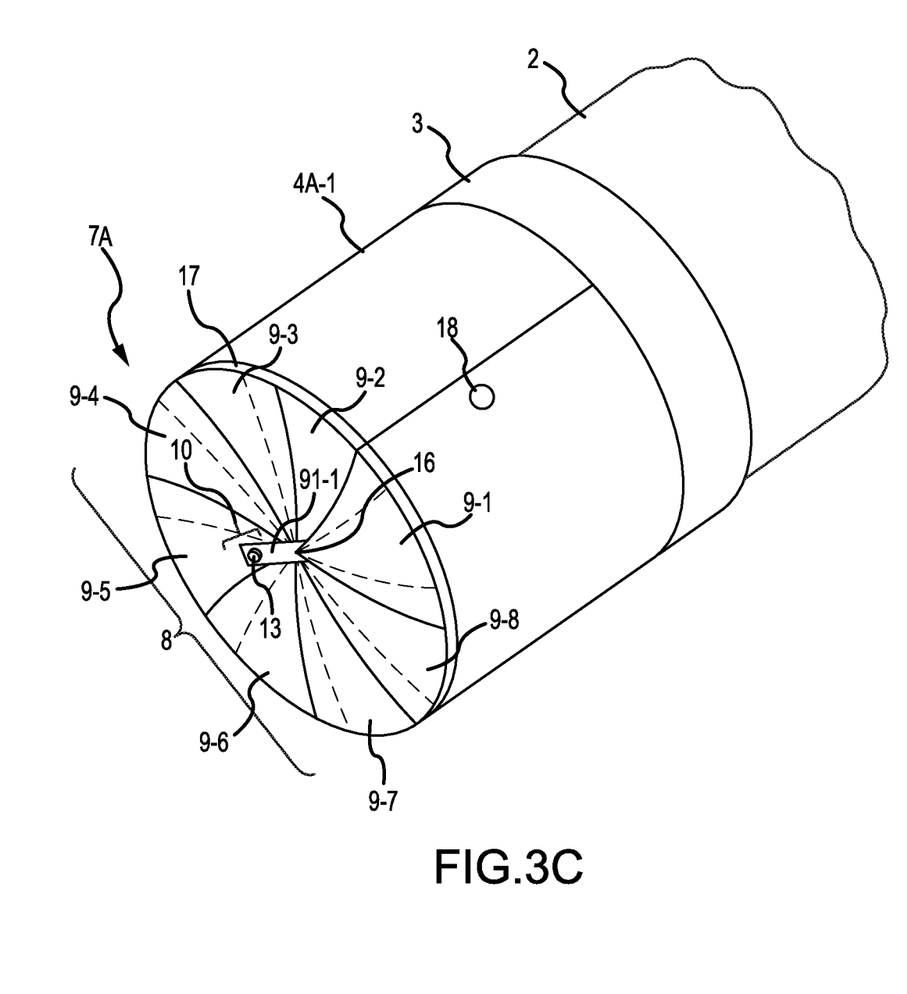

For example, the spiral interleave transition structure 8 may comprise a plurality of spiral interleaves 9, such as a first spiral interleave 9-1, a second spiral interleave 9-2, a third spiral interleave 9-3, a fourth spiral interleave 9-4, a fifth spiral interleave 9-5, a sixth spiral interleave 9-6, a seventh spiral interleave 9-7, and an eighth spiral interleave 9-8. A spiral interleave 9 may comprise a flap arranged to spirally overlap at least one adjacent spiral interleave 9 also comprising a flap. FIG. 3B depicts, in accordance with various embodiments, spiral interleave transition structure 8 when some spiral interleaves 9 are in an open configuration and not enclosing the end closure of structure 2. FIG. 3C depicts, in accordance with various embodiments, spiral interleave transition structure 8 when spiral interleaves 9 are all in a closed configuration and forming an enclosure around the end closure of structure 2.

In various embodiments, the spiral interleave transition structure 8 may further comprise an affixation tab 91. An affixation tab 91 may comprise a portion of the spiral interleave lying outward of the other spiral interleaves relative to the underlying structure 2. For instance, the affixation tab 91 may comprise a portion of the first spiral interleave 9-1 as depicted. The affixation tab 91 may extend over at least a portion of at least one other spiral interleave.

In various embodiments, a closure 10 may be disposed in a portion of the affixation tab 91, whereby the first spiral interleave 9-1 may be fixed in position and thus may retain the other spiral interleaves in position as well. A fastener 13 may comprise a snap fastener disposed through a portion of an affixation tab and configured to selectably attach to a reciprocal snap fastener piece disposed through a portion of another spiral interleave 9 and/or another aspect of the thermal protection apparatus 4. In various embodiments, the fastener may be a snap, a grommet and post/capsan, a bayonet lock, and/or the like.

Spiral interleave transition structure 8 may comprise a spiral matrix intersection 16. A spiral matrix intersection 16 may comprise a region of a distal tip of each spiral interleave 9 (other than the spiral interleave having the affixation tab 91) that overlaps each other spiral interleave 9. In this manner, each such spiral interleave 9 frictionally engages at least one other spiral interleave 9 so that spiral interleaves 9 resist separation from the underlying structure and thus resist the development of thermal leaks.

Figure 4A:
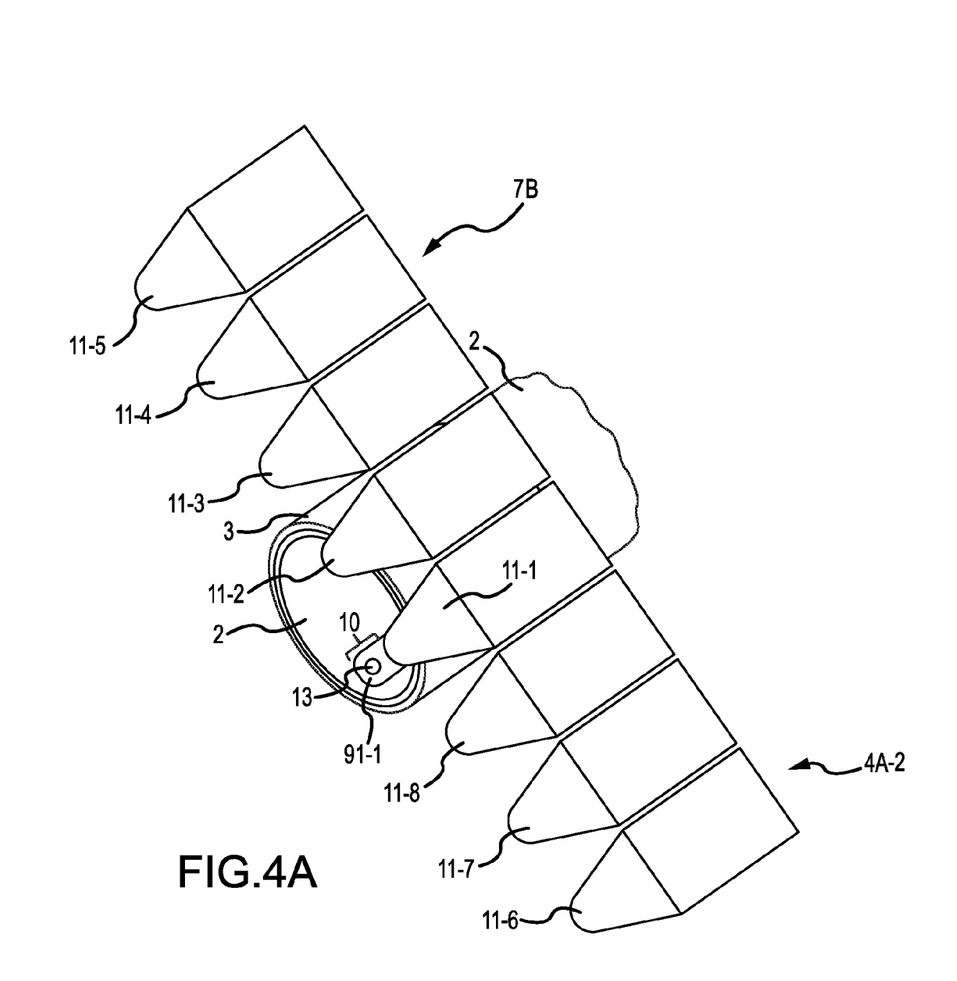
FIGS. 4A, 4B, and 4C illustrate various aspects of a petal overlap transition structure at a closure, in accordance with various embodiments.

With reference to FIGS. 2 and 4A-4C, in various embodiments, a transition structure 7B may comprise a petal overlap transition structure 21. FIG. 4A depicts thermal protection apparatus 4A-2 before being coupled to wrap member 3. In various embodiments, thermal protection apparatus 4A2 may comprise strips of material that couple to each other, wrap member 3, and/or structure 2 by sewing, molding, bonding, and/or the like, circumferentially around wrap member 3 at the dimensional transition of structure 2.

Figure 4B:
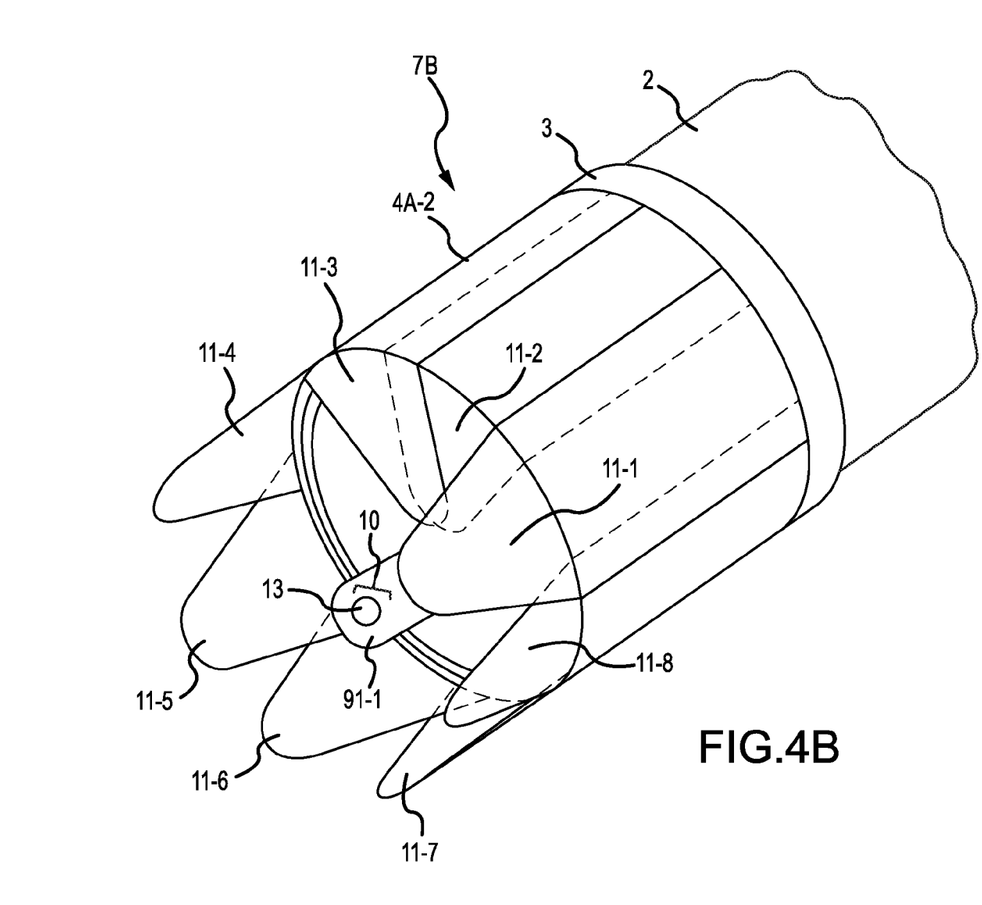

In various embodiments, a petal overlap transition structure 21 may comprise a plurality of petal interleaves 11, such as a first petal interleave 11-1, a second petal interleave 11-2, a third petal interleave 11-3, a fourth petal interleave 11-4, a fifth petal interleave 11-5, a sixth petal interleave 11-6, a seventh petal interleave 11-7, and an eighth petal interleave 11-8. The petal interleaves 11 may be arranged to partially overlap at least one adjacent petal interleave 11 when overlaid on a portion of a structure exhibiting a dimensional transition. FIG. 4B depicts, in accordance with various embodiments, petal overlap transition structure 21 when some petal interleaves 11 are in an open configuration and not enclosing the end closure of structure 2. FIG. 3C depicts, in accordance with various embodiments, petal overlap transition structure 21 when petal interleaves 11 are all in a closed configuration and are enclosing the end closure of structure 2.

Figure 4C:
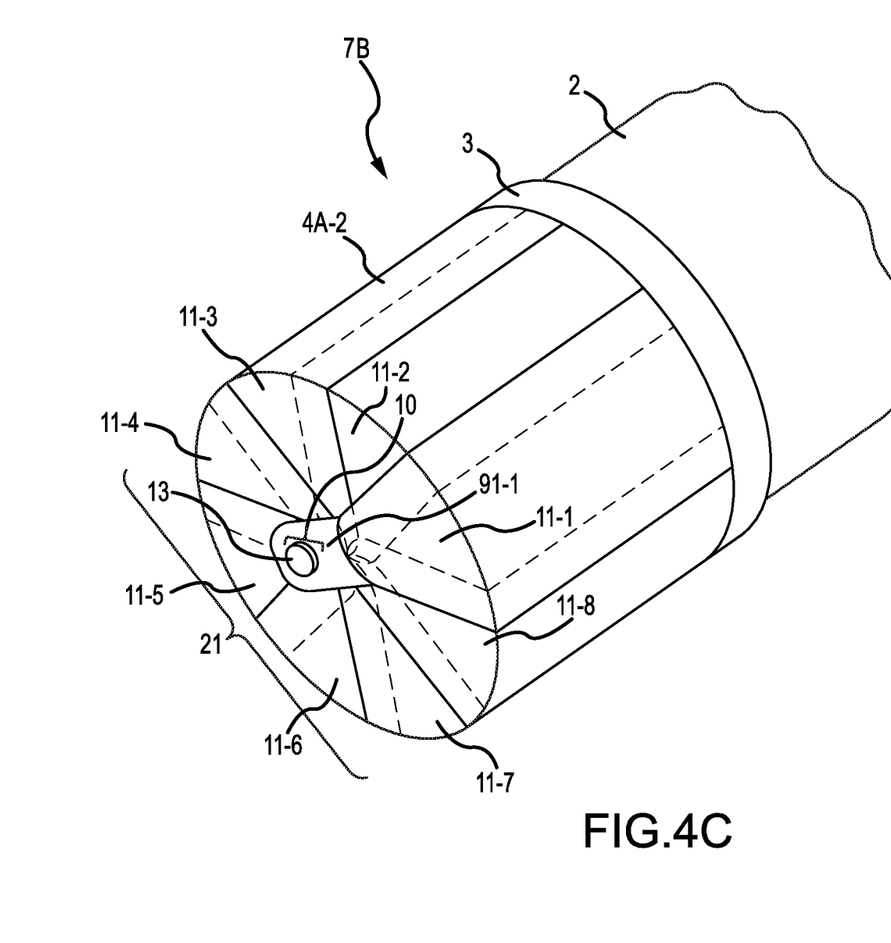

In various embodiments, a petal interleave 11 may comprise a curved shape. For example, the curved shape may be a shape resembling a cross section of a conic, or a tangent ogive shape, or a spherically blunted tangent ogive shape, or a secant ogive shape or an elliptical shape, or an oval shape, or a parabolic shape, or an ovoid shape, or an ellipsoid shape, or a shape defined by a power series, or any other shape as desired.

In various embodiments, petal overlap transition structure 21 may further comprise an affixation tab 91. Affixation tab 91 may comprise a portion of the petal interleave lying outward of the other petal interleaves 11 relative to the underlying structure 2. For instance, the affixation tab 91 may comprise a portion of the first petal interleave 11-1 as depicted. The affixation tab 91 may extend over at least a portion of at least one other petal interleave 11. A closure 10 may be disposed in a portion of the affixation tab 91, whereby the petal spiral interleave 11-1 may be fixed in position and thus may retain the other petal interleaves in position as well.

The closure 10 may comprise a fastener 13, such as snap. Fastener 13, may comprise a snap fastener disposed through a portion of an outermost petal interleave 11 (outermost relative to the other petal interleaves) and configured to selectably attach to a reciprocal snap fastener piece disposed through a portion of another petal interleave 11 and/or another aspect of the thermal protection apparatus 4A-2. Thus, at least one petal interleave 11 is connected to another aspect of the thermal protection apparatus 4A-2 at a distal end and thus frictionally engages the remaining petal interleaves 11 so that all petal interleaves 11 resist separation from the underlying structure and thus resist the development of thermal leaks. In further embodiments, multiple petal interleaves 11 comprise snaps 15, and thus connect to one another, or another aspect of the thermal protection apparatus 4A-2 such as the protective layer 6 (See FIG. 2). For instance, in various embodiments, at least two petal interleaves 11 are connected together and frictionally engage the remaining petal interleaves 11 so that all petal interleaves 11 resist separation from the underlying structure and thus resist the development of thermal leaks.

Figure 5:
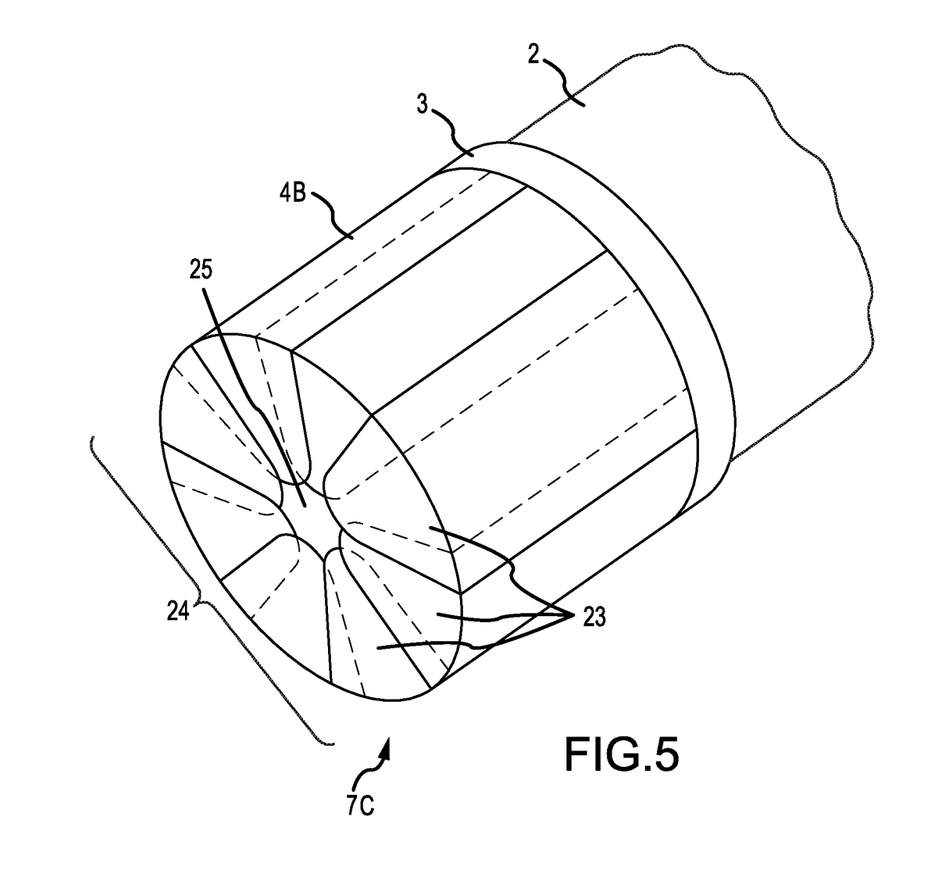
FIG. 5 illustrates various aspects of a flap overlay transition structure at a dimensional reduction, in accordance with various embodiments.

With reference to FIGS. 2 and 5, a transition structure 7C may comprise a petal overlap transition structure 24 in thermal that may be structured and function similarly to petal overlap transition structure 21 depicted and described in relation to FIGS. 4A-4C. In various embodiments, petal overlap transition structure 24 may comprise petal interleaves 23. The petal interleaves 23 may be arranged to partially overlap at least one adjacent petal interleave 23 when overlaid on a portion of a structure exhibiting a dimensional transition. However, petal interleaves 23, when overlapping one another and forming a closure, may leave exposed a dimensional reduction portion 25 of structure 2, at which a dimensional reduction occurs. In various embodiments, the distal tips of petal interleaves 23 may point away from dimensional reduction point 25 (by being bent, curved and/or the like from the rest of the petal interleave), which may leave dimensional reduction point 25 exposed. Transition structure 7C leaving dimensional reduction point 25 exposed may allow for the thermal insulation of dimensional reductions, as generally depicted in FIG. 1B.

In various embodiments, petal overlap transition structure 24 may comprise an affixation tab, similar to affixation tab 91 in FIG. 4C. The affixation tab may comprise a portion of the petal interleave lying outward of the other petal interleaves 23 relative to the underlying structure 2. The affixation tab may extend over at least a portion of at least one other petal interleave 23. The affixation tab may be fixed in position and thus may retain the other petal interleaves in position as well. In various embodiments, at least one affixation flap may extend across one or more petal interleaves 23, and affix to the radial side of transition structure 7C, thereby holding petal interleaves 23 in place.

Figure 6:
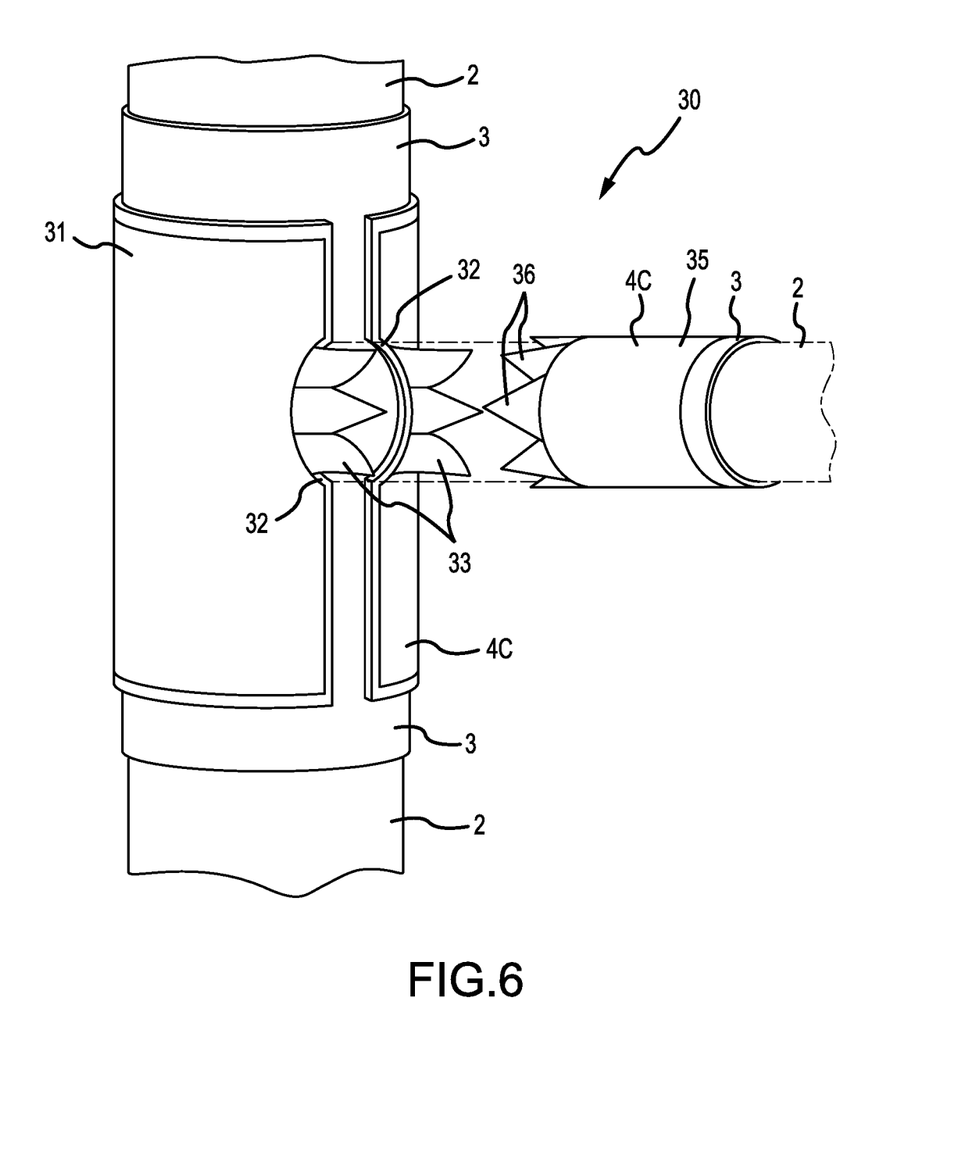
FIG. 6 illustrates various aspects of a flap overlay transition structure at a manifold joint, in accordance with various embodiments.
Figure 7:
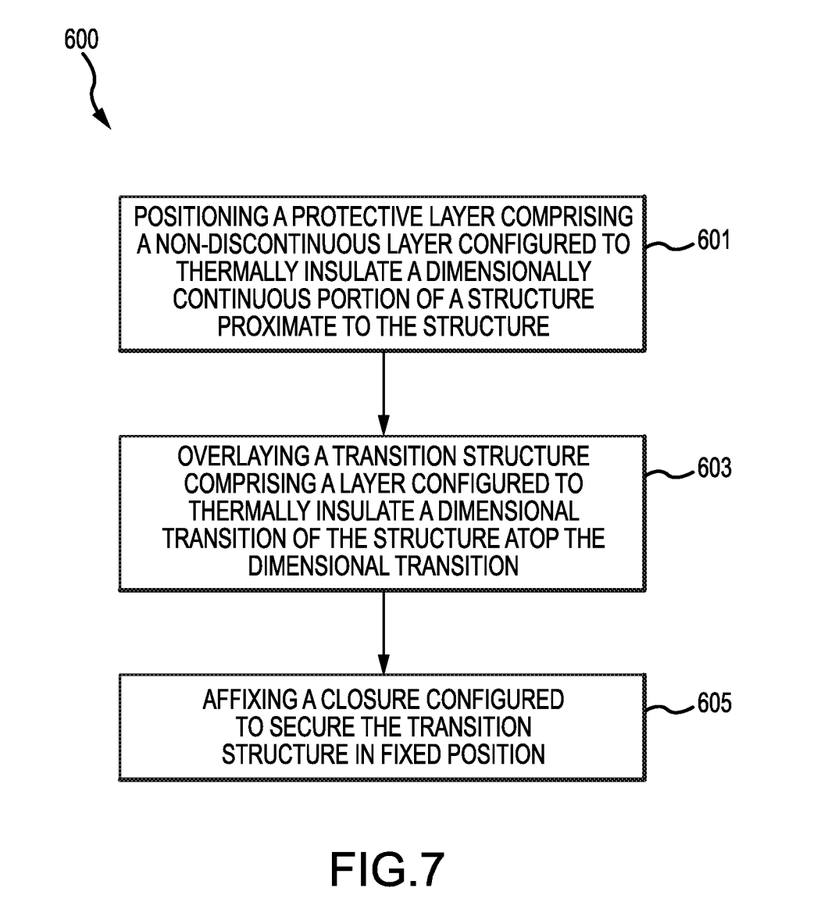
FIG. 7 illustrates a method of installing a thermal protection apparatus, in accordance with various embodiments.

With reference to FIGS. 2 and 6, a thermal protection apparatus 4B is depicted at a manifold joint of structure 2, in accordance with various embodiments. Thermal protection apparatus 4B may comprise a transition structure 30 comprising a primary insulator 31 and/or a secondary insulator 35. Primary insulator 31 may be configured to wrap circumferentially around a primary component of structure 2 and/or wrap member 3. Secondary insulator 35 may be configured to wrap circumferentially around a secondary component of structure 2 and/or wrap member 3.

In various embodiments, the ends of primary insulator 31 may comprise cutouts 32. Primary flaps 33 may be comprised in cutouts 32. A side of secondary insulator 35 may comprise secondary flaps 36. To thermally insulate the manifold joint of structure 2, secondary flaps 36 may be disposed between primary insulator 31 and structure 2 and/or wrap member 3, contained within cutouts 32. Primary flaps 33 may fold down over secondary flaps 36. In various embodiments, primary flaps 33 may be disposed between secondary insulator 33 and structure 2 and/or wrap member 3, and/or secondary flaps 36 may fold down over primary flaps 33. In various embodiments, primary flaps 33 and/or secondary flaps 36 may be held in place by an affixation tab, similar to those described in relation to FIGS. 3C and 4C. Though depicted as a T-joint in FIG. 6, a manifold joint may comprise any change in a structure in which the structure no longer continues along one axis (e.g., a Y-shape, an L-shape, a bend of any angle, etc.).

Finally, and with reference to FIGS. 1-6, and FIG. 7, a method 600 of installing a thermal protection apparatus 4 is provided. The method 600 may include positioning a protective layer 6 comprising a non-discontinuous layer configured to thermally insulate a dimensionally continuous portion of a structure 2 proximate to the structure 2 (step 601). The method 600 may further include overlaying a transition structure 7 comprising a layer configured to thermally insulate a dimensional transition of the structure 2 atop the dimensional transition (step 603). Finally, the method 600 may contemplate affixing a closure 10 configured to secure the transition structure 7 in fixed position (step 605).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A thermal protection apparatus comprising:
A spiral interleave transition structure comprising a layer configured to thermally insulate a dimensional transition of the structure, a plurality of flaps arranged to spirally overlap and configured to conform to the dimensional transition; and
an affixation tab comprising a portion of a flap from the plurality of flaps lying outward of the other flaps and a closure configured to secure the transition structure in fixed position.

2. The thermal protection apparatus of claim 1, further comprising a spiral matrix intersection comprising a region of a distal tip of each flap wherein each flap of the plurality of flaps overlaps at least another flap.

3. A thermally protected structure comprising:
a thermal protection apparatus comprising a spiral interleave transition structure having a plurality of flaps arranged to spirally overlap and an affixation tab comprising a portion of a flap from the plurality of flaps; and
a structure comprising a dimensional transition,
wherein the spiral interleave transition structure overlays and is configured to conform to the dimensional transition, secures the spiral interleave transition structure via the affixation tab, and thermally insulates the dimensional transition.

4. The thermally protected structure according to claim 3, wherein the affixation tab comprises a closure configured to secure the transition structure in fixed position.

5. The thermal protection apparatus of claim 4, wherein the closure comprises a spiral matrix intersection comprising a region of a distal tip of each flap wherein each flap of the plurality of flaps overlaps at least another flap.

6. A thermal protection apparatus comprising:
A petal overlap transition structure comprising a layer configured to thermally insulate a dimensional transition of the structure and a plurality of petal interleaves arranged to at least partially overlap; and
an affixation tab comprising a portion of a petal interleave from the plurality of petal interleaves lying outward of the other petal interleaves and a closure configured to secure the transition structure in fixed position.

7. The thermal protection apparatus of claim 6, wherein each petal interleave in the plurality of petal interleaves comprises a curved shape.

8. The thermal protection apparatus of claim 7, wherein the curved shape comprises at least one of:
a cross section of a conic;
a tangent ogive;
a spherically blunted tangent ogive;

a secant ogive;
an elliptical shape;
an oval shape;
a parabolic shape;
an ovoid shape;
an ellipsoid shape; or
a shape defined by a power series.

9. The thermal protection apparatus of claim 6, wherein the closure comprises a fastener.

10. The thermal protection apparatus of claim 9, wherein the fastener is disposed through a portion of at least one of the plurality of petal interleaves.

11. The thermal protection apparatus of claim 10, wherein the fastener is disposed through the portion of the petal interleave comprising the petal interleave that is outermost relative to the other petal interleaves.

12. The thermal protection apparatus of claim 6, wherein a plurality of petal interleaves leave exposed a dimensional reduction portion.

13. The thermal protection apparatus of claim 12, wherein each flap interleave further comprises a curved distal tip.

\* \* \* \* \*